United States Patent
Lyle et al.

(10) Patent No.: US 6,694,340 B1
(45) Date of Patent: Feb. 17, 2004

(54) TECHNIQUE FOR DETERMINING THE AGE OF THE OLDEST READING TRANSACTION WITH A DATABASE OBJECT

(75) Inventors: Robert William Lyle, Morgan Hill, CA (US); James Zu-Chia Teng, San Jose, CA (US); Jay A. Yothers, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 368 days.

(21) Appl. No.: 09/322,698

(22) Filed: May 28, 1999

Related U.S. Application Data
(60) Provisional application No. 60/101,729, filed on Sep. 24, 1998.

(51) Int. Cl.7 ............................................... G06F 17/30
(52) U.S. Cl. ................... 707/204; 707/1; 707/8; 707/10; 707/100; 707/102; 707/103; 707/200; 707/202; 707/203; 707/206
(58) Field of Search ............... 707/1–10, 100–104.1, 707/200–205, 511; 714/5, 15, 19–20; 711/113, 119, 146–167, 155–156, 161–162, 165, 170; 705/38; 709/101–102

(56) References Cited

U.S. PATENT DOCUMENTS

| | | | |
|---|---|---|---|
| 4,509,119 A | 4/1985 | Gumaer et al. | 711/136 |
| 4,949,388 A | 8/1990 | Bhaskaran | 382/159 |
| 4,961,134 A | 10/1990 | Crus et al. | 707/8 |
| 5,043,866 A | 8/1991 | Myre, Jr. et al. | 707/202 |
| 5,222,235 A | 6/1993 | Hintz et al. | 707/101 |
| 5,247,672 A * | 9/1993 | Mohan | 711/152 |
| 5,261,088 A | 11/1993 | Baird et al. | 707/206 |
| 5,291,583 A | 3/1994 | Bapat | 717/5 |
| 5,295,188 A | 3/1994 | Wilson et al. | 380/30 |
| 5,396,623 A * | 3/1995 | McCall et al. | 707/101 |
| 5,408,654 A | 4/1995 | Barry | 707/101 |
| 5,416,915 A | 5/1995 | Mattson et al. | 711/114 |
| 5,418,921 A | 5/1995 | Cortney et al. | 711/114 |
| 5,418,940 A | 5/1995 | Mohan | 714/5 |
| 5,435,004 A | 7/1995 | Cox et al. | 707/205 |
| 5,446,884 A * | 8/1995 | Schwendemann et al. | 707/202 |
| 5,452,299 A | 9/1995 | Thessin et al. | 370/260 |
| 5,455,944 A | 10/1995 | Haderle et al. | 435/28 |
| 5,517,641 A | 5/1996 | Barry et al. | 707/101 |
| 5,566,329 A | 10/1996 | Gainer et al. | 707/4 |
| 5,579,499 A | 11/1996 | Fecteau et al. | 711/209 |
| 5,579,515 A | 11/1996 | Hintz et al. | 707/7 |
| 5,581,750 A * | 12/1996 | Haderle et al. | 714/20 |
| 5,613,113 A * | 3/1997 | Goldring | 707/202 |
| 5,630,093 A | 5/1997 | Holzhammer et al. | 711/115 |
| 5,666,560 A | 9/1997 | Moertl et al. | 710/68 |
| 5,675,767 A * | 10/1997 | Baird et al. | 711/156 |

(List continued on next page.)

FOREIGN PATENT DOCUMENTS

| | | |
|---|---|---|
| EP | 1046980 A2 * | 10/2000 |
| JP | 8-167852 | 6/1996 |

OTHER PUBLICATIONS

Fernaddo De Ferreira Rezende et al., Transaction Identifiers in Nested Trasactions: Implementation Schemes and performanc the computer journal, Vol 40, No. 5, Aug. 20, 1997, pp245–258.*

(List continued on next page.)

*Primary Examiner*—Srirama Channavajjala
(74) *Attorney, Agent, or Firm*—Sughrue Mion, PLLC

(57) ABSTRACT

A method, apparatus, and article of manufacture for identifying read claims in a database. In accordance with the present invention, the database is stored on at least one data storage device connected to a computer. A read identifier is stored for each reading transaction. The read identifier reflects a time at which the reading transaction first accesses an object stored in the database. The read identifiers are used to determine an age of an oldest active transaction.

36 Claims, 6 Drawing Sheets

U.S. PATENT DOCUMENTS

| | | | |
|---|---|---|---|
| 5,684,986 A | | 11/1997 | Moertl et al. ............... 707/101 |
| 5,687,343 A | | 11/1997 | Fecteau et al. ............. 711/202 |
| 5,696,967 A | * | 12/1997 | Hayashi et al. ............. 395/618 |
| 5,721,915 A | | 2/1998 | Sockut et al. ............... 707/200 |
| 5,727,197 A | | 3/1998 | Burgess et al. ................ 707/2 |
| 5,732,402 A | | 3/1998 | Lehman ...................... 707/205 |
| 5,737,601 A | | 4/1998 | Jain et al. ................... 707/201 |
| 5,742,806 A | | 4/1998 | Reiner et al. .................. 707/3 |
| 5,742,810 A | | 4/1998 | Ng et al. ........................ 707/4 |
| 5,758,357 A | | 5/1998 | Barry et al. ................ 707/202 |
| 5,761,667 A | | 6/1998 | Koeppen .................... 707/101 |
| 5,873,116 A | * | 2/1999 | Van Fleet ................... 711/147 |
| 6,144,970 A | * | 11/2000 | Bonner et al. .............. 707/206 |
| 6,185,663 B1 | * | 2/2001 | Burke ......................... 711/156 |
| 6,343,293 B1 | * | 1/2002 | Lyle ............................ 707/101 |
| 6,363,389 B1 | * | 3/2002 | Lyle et al. ................... 707/100 |
| 6,470,359 B1 | * | 10/2002 | Lyle ............................ 707/202 |
| 6,535,895 B2 | * | 3/2003 | Bonner et al. .............. 707/205 |
| 6,606,617 B1 | * | 8/2003 | Bonner et al. ................. 707/2 |

OTHER PUBLICATIONS

LihChyun Shu et al., Shadowing–based crash recovery schemes for real–time database systems, Jun. 9–11, 1999, Real–time system, 1999 proceedings of the Euromicro Conference, pp 260–267.*

IBM Technical Disclosure Bulletin, "Method For Storing Large Objects in a Relational Database," vol. 35, No. 4A, pp. 72–75, Sep. 1992.

IBM Technical Disclosure Bulletin, "Reorganization Flags For Table Indexes," vol. 35, No. 5, pp. 156–157, Oct. 1992.

IBM Technical Disclosure Bulletin, "Technique to Allow DB2 Utilities and Commands to Run While SQL Applications Have a Table Space Locked," vol. 36, No. 09A, pp. 499–501, Sep. 1993.

IBM Technical Disclosure Bulletin, "Spanning Temporary Reorg Files," vol. 36, N. 06A, p. 159, Jun. 1993.

IBM Technical Disclosure Bulletin, "Segmented Relational Database Tables," vol., 38, No. 07, pp. 219–220, Jul. 1995.

IBM Technical Disclosure Bulletin, "Mapping a Relational Database to a Hierarchical File System," vol. 38, No. 10, pp. 309–311, Oct. 1995.

IBM Technical Disclosure Bulletin, "Fine Granularity Locking to Support High Data Availability in a Client/Server Database Management System," vol. 38, No. 02, pp. 143–145, Feb. 1995.

Joon Seek Kim, et al., "Mapping Parameter Estimation Using Integral Projections And Segmented Moving Objects in Object–Oriented Analysis–Synthesis Coding," Optical Engineering, vol. 35, No. 1, pp. , Jan. 1996 –Only One Page–Abstract–.

MJ Carey, et al., "Object And File Management in The EXODUS Extensible Databese System," Proceedings of Very Large Data Bases. Twelfth International Conference on Very Large Data Bases, Kyoto, Japan, pp. , Aug. 25–28, 1986 –Only One Page–Abstract–.

ML McAuliffe, et al., "Towards Effective and Efficient Free Space Management," 1996 ACM SIGMOD International Conference on Management of Data, Montreal, Quebec, Canada, Jun. 4–6, 1996 –Only One Page–Abstract–.

C. Mohan, "Disk Read–Write Optimizations and Data Integrity in Transaction Systems Using Write–Ahead Logging," Proceedings of the Eleventh International Conference on Data Engineering (Cat. No. 95CH35724), Taipei, Taiwan, Mar. 6–10, 1995 –Only One Page–Abstract–.

Ki Sik Pang, et al., "An Efficient Recovery Scheme For Large Data in Multimedia DBMS," Journal of the Korea Information Science Society, vol. 22, No. 2, pp. 206–217, Feb. 1995 –Only One Page–Abstract.

C. Mohan, et al., "Algorithms For Flexible Space Management in Transaction Systems Supporting Fine–Granularity Locking," Advances in Database Technology—EDBT '94. 4th International Conference on Extending Database Technology, Cambridge, UK, Mar. 28–31, 1994 –Only One Page–Abstract–.

Martin Marshall, "Time Warner Big on Oracle Objects. (Testing Oracle 8's Ability to Move Large Object Blocks)," (Company Operations),(Brief Article), Communications Week Issue: n676, pp. 1–3, Aug. 11, 1997.

HweeHwa Pang, "Tertiary Storage in Multimedia Systems: Staging or Direct Access?", Multimedia Systems, vol. 5, Issue: 6, pp. 1–2, Dec. 1, 1997.

Dr. Michael Stonebraker, "The Empire Strikes Back: DB2 Universal Database," http://www.oreview.com/9704side.htm, pp. 1–7, 1997.

GH Sokut, "A Method For On–Line Reorganization of a Database," IBM System Journal, vol.. 36, No. 3 pp. 411–436, 1997 –Only Abstract–.

H. Koide, et al., "A New Memory Allocation Method For Shared Memory Multiprocessors With Large Virtual Address Space," Concurrency: Practice and Experience, vol. 9, No. 9, pp. 897–914, Sep. 1997 –Only Abstract.

* cited by examiner

TECHNIQUE FOR DETERMINING THE AGE OF THE OLDEST READING TRANSACTION WITH A DATABASE OBJECT

PROVISIONAL APPLICATION

This application claims the benefit of U.S. Provisional Application No. 60/101,729, entitled "IMPROVED DATABASE SYSTEM," filed on Sep. 24, 1998, by Charles R. Bonner et al., which is incorporated by reference herein.

CROSS-REFERENCE TO RELATED APPLICATIONS

This application is related to the following co-pending and commonly-assigned patent applications:

application Ser. No. 09/322,312, entitled "USING AN EPOCH NUMBER TO OPTIMIZE ACCESS WITH ROWID COLUMNS AND DIRECT ROW ACCESS," is now U.S. Pat. No. 6,366,902 filed on same date herewith, by Robert W. Lyle et al.;

application Ser. No. 09/321,675, is now U.S. Pat. No. 6,470,359 entitled "A FAST TECHNIQUE FOR RECOVERING AN INDEX ON AN AUXILIARY TABLE," filed on same date herewith, by Robert W. Lyle et al.;

application Ser. No. 09/322,292, is now U.S. Pat. No. 6,343,293 entitled "STORING AN UNCOMPRESSED DATA LENGTH IN A LOB MAP TO SPEED SUBSTRING ACCESS WITHIN A LOB VALUE," filed on same date herewith, by Robert W. Lyle et al.;

application Ser. No. 09/322,287, is now U.S. Pat. No. 6,535,892 entitled "A TECHNIQUE TO AVOID PROCESSING WELL CLUSTERED LOB'S DURING REORGANIZATION OF A LOB TABLE SPACE," filed on same date herewith, by Charles R. Bonner et al.;

application Ser. No. 09/322,317, is now U.S. Pat. No. 6,606,617 entitled "AN OPTIMIZED TECHNIQUE FOR PREFETCHING LOB TABLE SPACE PAGES," filed on same date herewith, by Charles R. Bonner et al.;

application Ser. No. 09/322,286, is now U.S. Pat. No. 6,363,389 entitled "A TECHNIQUE FOR CREATING A UNIQUE QUASI-RANDOM ROW IDENTIFIER," filed on same date herewith, by Robert W. Lyle et al.;

application Ser. No. 09/372,315, is now abandoned entitled "AN EFFICIENT TECHNIQUE TO DEFER LARGE OBJECT ACCESS WITH INTERMEDIATE RESULTS," filed on same date herewith, by Christine M. Lee et al.; and application Ser. No. 09/322,316, is now U.S. Pat. No. 6,144,970 entitled "A TECHNIQUE FOR INPLACE REORGANIZATION OF A LOB TABLE SPACE," filed on same date herewith, by Charles R. Bonner et al.;

each of which is incorporated by reference herein.

BACKGROUND OF THE INVENTION

1. Field of the Invention

This invention relates in general to computer-implemented database systems, and, in particular, to identifying read claims in a database.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples or records. A database will typically have many tables and each table will typically have multiple tuples and multiple columns. Tables are assigned to table spaces. A table space is associated with direct access storage devices (DASD), and, thus, tables are stored on DASD, such as magnetic or optical disk drives for semi-permanent storage.

A table space can be a system managed space (e.g., an operating system file system) or a database managed space. Each table space is physically divided into equal units called pages. Each page, which may contain, for example, 4K bytes, holds one or more rows of a table and is the unit of input/output (I/O). The rows of a table are physically stored as records on a page. A record is always fully contained within a page and is limited by page size. As users move towards working with image data and other large data objects, storing data in conventional records becomes difficult.

An index is an ordered set of references to the records or rows in a database file or table. The index is used to access each record in the file using a key and a record identifier (RID). A key is one of the fields of the record or one of the attributes of a row. The key ensures that a row is unique. The RID provides the physical location of a row (i.e., the page number and location within the page). Building an index for a large file can take a considerable amount of elapsed time. The process involves scanning all records in the file, extracting a key value and RID value from each of the records, sorting all of the key/RID values, and then building the index from the sorted key/RID values.

Traditionally, an RDBMS stored simple data, such as numeric and text data. In a traditional RDBMS, the underlying storage management has been optimized for simple data. More specifically, the size of a record is limited by the size of a data page, which is a fixed number (e.g., 4K) defined by a computer developer. This restriction in turn poses a limitation on the length of columns of a table. To alleviate such a restriction, most computer developers today support a new built-in data type for storing large objects (LOBs). LOBs, such as image data, typically take up a great deal of storage space.

In a shared data environment, some DBMSs use a LOB manager sub-component that manages space in LOB table spaces (e.g., deallocates and allocates LOB table space). These table spaces use a shadow copy recovery scheme. Using such a scheme, when a LOB value is deleted, the pages storing the LOB value are deallocated, but must be protected from reallocation until the deleting transaction commits and no other transaction is reading the value anymore. For example, when a LOB is deleted, the pages storing the LOB value are deallocated. Before reallocating the pages, the LOB manager sub-component ensures that any deallocated space is committed, and that no currently active transaction has a read interest in the deleted LOB. In conventional systems, both of these checks are performed using locking.

Locking is used in a shared data environment to prevent concurrent transactions from inconsistently modifying the same data. That is, one transaction can lock a portion of the table space to prevent other transactions from modifying the data while that one transaction is accessing the data in the locked portion of the table space. Thus, locking can guarantee for one transaction that shared data accessed by that transaction does not contain uncommitted updates of other transactions. In particular, locks ensure that a user does not access data that has been changed by another user and not yet committed or data that has been earmarked for change. However, locking is time consuming and slows the speed of page allocations.

Therefore, there is a need in the art for an improved technique of determining the age of reading transactions in a database.

SUMMARY OF THE INVENTION

To overcome the limitations in the prior art described above, and to overcome other limitations that will become apparent upon reading and understanding the present specification, the present invention discloses a method, apparatus, and article of manufacture for identifying read claims in a database.

In accordance with the present invention, the database is stored on at lease one data storage device connected to a computer. A read identifier is stored for each reading transaction. The read identifier reflects a time at which the reading transaction first accesses an object stored in the database. The read identifiers are used to determine an age of an oldest active transaction.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
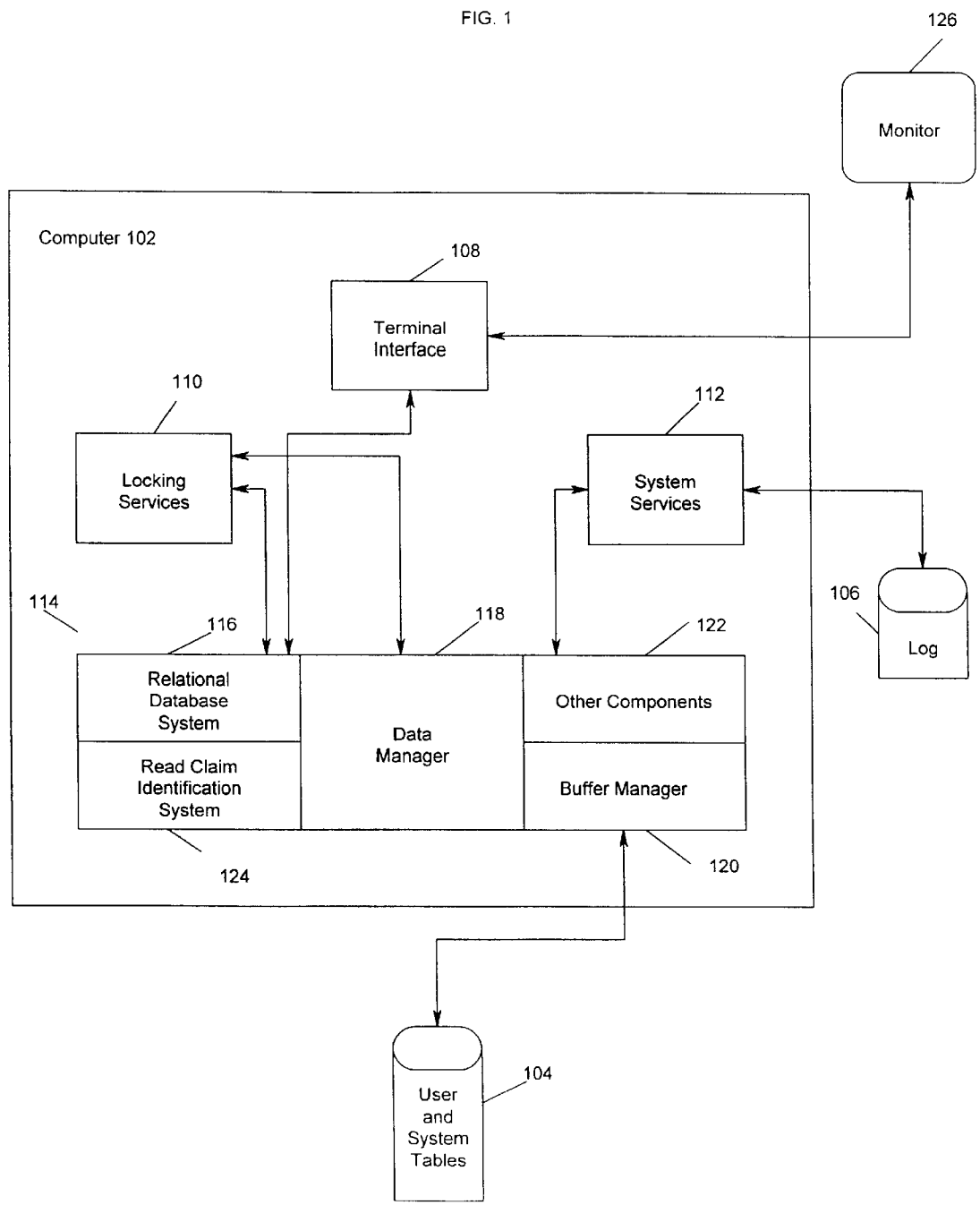
FIG. 1 is a block diagram illustrating an exemplary computer hardware environment that could be used in accordance with the present invention.

FIG. 1 is a block diagram illustrating an exemplary computer hardware environment that could be used in accordance with the present invention. In the exemplary environment, a computer system 102 is comprised of one or more processors connected to one or more data storage devices 104 and 106 that store one or more relational databases, such as a fixed or hard disk drive, a floppy disk drive, a CDROM drive, a tape drive, or other device.

Operators of the computer system 102 use a standard operator interface 108, such as IMS/DB/DC®, CICS®, TSO®, OS/390®, ODBC® or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software.

The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

In the preferred embodiment of the present invention, the RDBMS software comprises the DB2® product offered by IBM for the OS/390® operating systems. Those skilled in the art will recognize, however, that the present invention has application program to any RDBMS software, whether or not the RDBMS software uses SQL.

As illustrated in FIG. 1, the DB2® system for the OS/390® operating system includes three major components: the Internal Resource Lock Manager (IRLM) 110, the Systems Services module 112, and the Database Services module 114. The IRLM 110 handles locking services for the DB2® system, which treats data as a shared resource, thereby allowing any number of users to access the same data simultaneously. Thus concurrency control is required to isolate users and to maintain data integrity. The Systems Services module 112 controls the overall DB2® execution environment, including managing log data sets 106, gathering statistics, handling startup and shutdown, and providing management support.

At the center of the DB2® system is the Database Services module 114. The Database Services module 114 contains several submodules, including the Relational Database System (RDS) 116, the Data Manager 118, the Buffer Manager 120, the Read Claim Identification (RCI) System 124, and other components 122 such as an SQL compiler/interpreter. These submodules support the functions of the SQL language, i.e. definition, access control, interpretation, compilation, database retrieval, and update of user and system data. The RCI system 124 works in conjunction with the other submodules to allocate space in a database by determining whether a transaction has a read interest in a piece of data. In particular, the RCI system 124 may be used in conjunction with DBMSs such as DB2® Universal Database® (UDB®) for the OS/390® operating system.

The present invention is generally implemented using SQL statements executed under the control of the Database Services module 114. The Database Services module 114 retrieves or receives the SQL statements, wherein the SQL statements are generally stored in a text file on the data storage device 104 or are interactively entered into the computer system 102 by an operator sitting at a monitor 126 via operator interface 108. The Database Services module 114 then derives or synthesizes instructions from the SQL statements for execution by the computer system 102.

Generally, the RDBMS software, the SQL statements, and the instructions derived therefrom, are all tangibly embodied in a computer-readable medium, e.g. one or more of the data storage devices 104 and 106. Moreover, the RDBMS software, the SQL statements, and the instructions derived therefrom, are all comprised of instructions which, when read and executed by the computer system 102, causes the computer system 102 to perform the steps necessary to implement and/or use the present invention. Under control of an operating system, the RDBMS software, the SQL statements, and the instructions derived therefrom, may be loaded from the data storage device 104 into a memory of the computer system 102 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Using the Age of the Oldest Reading Transaction

The RCI system 124 of the present invention identifies the age of the oldest reading transactions within a database. In one embodiment of the invention, the RCI system uses the age of the oldest read transactions to allocate deallocated space in a database without using locks. Specifically, the RCI system 124 uses the dataset log sequence number (LSN) to determine whether any active transaction has a read interest in data stored in deallocated space. In this manner, the RCI system 124 is able to determine whether it may allocate this deallocated space to another transaction.

LOB Table Space Organization

Prior to discussing the technique of the embodiment of the present invention, a discussion of LOB table spaces will be provided.

Figure 2:
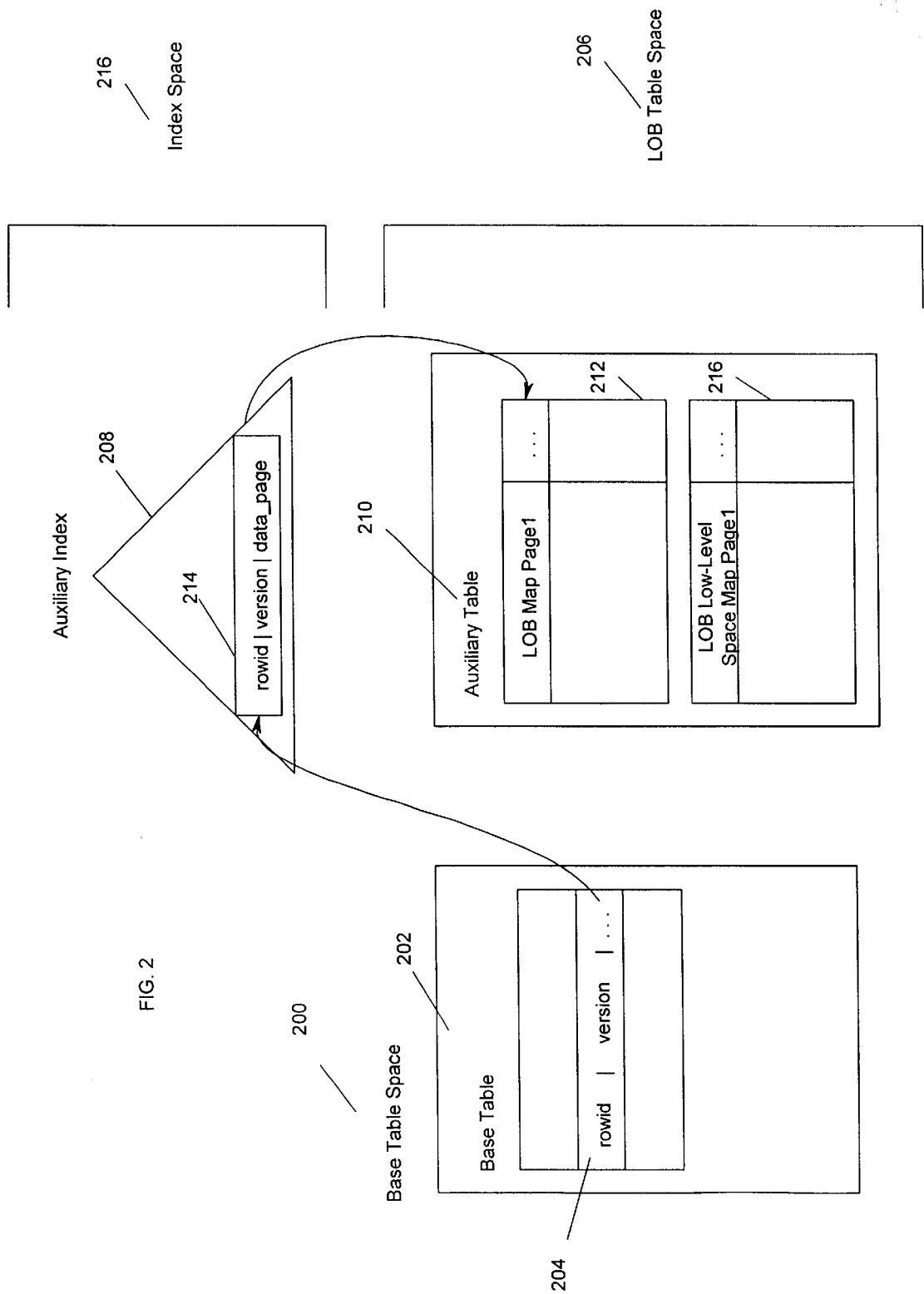
FIG. 2 is a block diagram illustrating an exemplary base table space and LOB table space.

FIG. 2 is a block diagram illustrating an exemplary base table space 200 and LOB table space 206. A base table space 200 contains a base table 202. The base table 202 is a table definition that logically contains rows and columns of data. For example, row 204 contains columns for a row identifier ("rowid"), a version number ("version), and other columns (indicated with the ellipses). The RCI system 124 stores LOB values in LOB columns outside of the base table 202. The LOB columns may be stored outside of the base table 202, but they still are logically part of the base table 202. The LOB values are stored in a LOB table space 206 that is completely separate from the base table space 200 in which the base table 202 is defined.

The LOB table space 206 contains an auxiliary table 210. The RCI system 124 requires that users define an auxiliary table 210 within the LOB table space 206 to contain the actual LOB values. The auxiliary index 208 is created on the auxiliary table 210 in index space 216. The data manager 118 has been extended to find LOB values. In particular, the data manager 118 uses the auxiliary index 208 to quickly find the LOB values for a specific row. In particular, the auxiliary index contains keys 214, which indicate the first LOB map page, such as LOB Map Page1 212. The first LOB map page acts as a directory to the LOB map and LOB pages of a LOB and assists with accessing the LOB data. In addition to LOB Map pages, such as LOB Map Page1 212, the auxiliary table 210 contains LOB low-level space map pages, such as LOB Low-Level Space Map Page1 216. LOB low-level space map pages assist in allocating and deallocating LOB pages. A high-level space map identifies the low-level space map pages.

Figure 3:
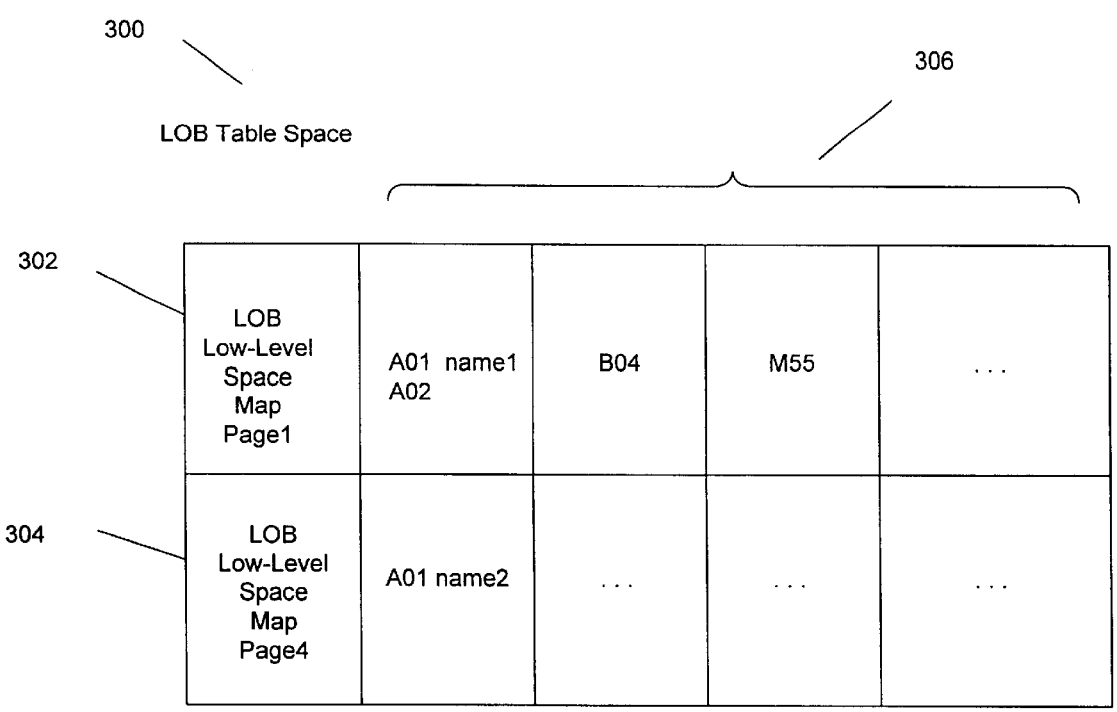
FIG. 3 is a block diagram illustrating an exemplary table space containing LOB low-level space map pages and data pages.

FIG. 3 is a block diagram illustrating an exemplary table space containing LOB low-level space map pages and LOB data pages. A table space 300 contains a number of LOB low-level space map pages 302, 304. Each LOB low-level space map page 302, 304 covers a number of LOB data pages 306. Each LOB data page is allocated to one LOB, even if the LOB uses only a portion of the LOB data page. For example, one LOB may be stored on 17 and a half LOB data pages, but the LOB data page that is half used is not allocated to any other LOB. Each LOB low-level space map page 302, 304 covers a fixed range of LOB data pages 306. A LOB low-level space map page 302, 304 identifies the LOB data pages 306 that are currently allocated to a LOB. When inserting a LOB, one or more LOB low-level space map pages 302, 304 are accessed to find LOB data pages that may be allocated to the LOB. All LOB data pages within a single table space have the same page size. A page may contain, for example, 4096 bytes.

Commit-LSN Technology

The RCI system 124 describes an optimization for determining whether pages may be reallocated within a table space that utilizes a shadow copy recovery scheme. The RCI system 124 proposes a specific method by which locking may be avoided during space allocation operations by using a new extension to the Commit-LSN technology. Thus, the RCI system may be referred to as the Read-LSN technology.

When transactions begin accessing database objects, some DBMSs require a transaction to obtain a claim on the database object. The claim performs checks to ensure that an object is available for a requested access (i.e., read or write access) and records the transaction's claims. When a transaction acquires a write claim, a DBMS using Commit-LSN technology records information about the time at which the claim is acquired. The time at which the write claim is acquired may be represented by a log sequence number (LSN, which is also known as a log relative byte address or LRBA). The time at which the write claim was acquired is stored in an agent control block. When transactions commit, they release their claims. As a result, the LSNs can be used to identify the oldest updating transaction within a table space (or within a data sharing group). Thus, Commit-LSN can be used to determine whether data has been committed.

LSNs are also associated with recorded page updates and other events of interest. The page updates and other events are recorded in a recovery log. In the recovery log, the LSNs are assigned in an ascending sequence and are the logical addresses of a corresponding log record. LSNs may also include timestamps or versions numbers. During recovery, the DBMS searches the recovery log for LSNs and page updates to be recovered.

DB2® for MVS® Version 4 introduced Commit-LSN checking (CLSN), which provides a technique for transactions to conservatively determine whether a page might have been updated by an active transaction. However, this optimization provided no relief for processes that need to determine whether any current transaction has a read interest in a piece of data. Additionally, it is desirable for transactions to have a technique for determining the age of the oldest reading transactions within a system. With such a check, as provided by the RCI system 124, it is be possible to avoid locking during the allocation of deallocated space.

The RCI System

The RCI system 124 extends the use of LSNs and allows the DBMS to also track acquired read claims on objects. For example, DB2® UDB® for OS/390® requires that read transactions acquire read claims (in either the cursor stability or repeatable read claim class). The RCI system 124 additionally records information about the time at which a read claim was acquired. The RCI system 124 works in conjunction with the DBMS to manage space in a LOB table space. Specifically, the RCI system 124 uses a read-LSN ("read identifier") to determine whether any active transaction might have a read interest in a deleted piece of data, and, if so, locking is used to determine if any reading transaction has a read interest.

Figure 4:
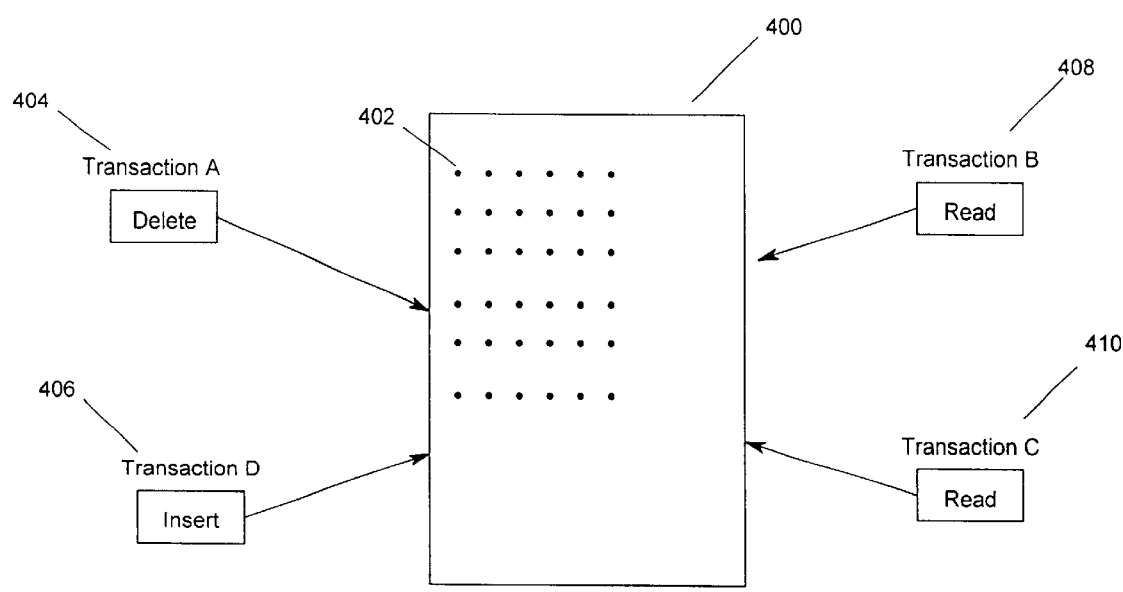
FIG. 4 is a block diagram illustrating exemplary active transactions that have read interests in a deleted LOB.

FIG. 4 is a block diagram illustrating exemplary active transactions 408 and 410 that have read interests in a deleted LOB 402 contained in a data space 400. Transaction A 404 is a delete transaction for deleting the LOB 402. When the LOB 402 is deleted, the data space 400 storing the LOB 402 is deallocated. The data space 400 must be protected from reallocation until transaction A 404 commits and no other transactions are reading the LOB 402. For example, assume both transaction B 408 and transaction C 410 have read interests in the LOB 402. The RCI system 124 avoids reallocating the space containing the deleted LOB 402 until transaction A 404 commits and the read transactions 408 and 410 complete (e.g., commit and/or release locators on the LOB 402). Once the reading is complete, the data space 400 may be reallocated to transaction D 406, which can then insert new data in the data space 400.

The read claim information is stored together with any write claim information about the database object in an agent control block. Additionally, in a shared environment, global agent control blocks contain the read claim information, and a chain of information about the current read claims is anchored off of the global agent control block.

Figure 5:
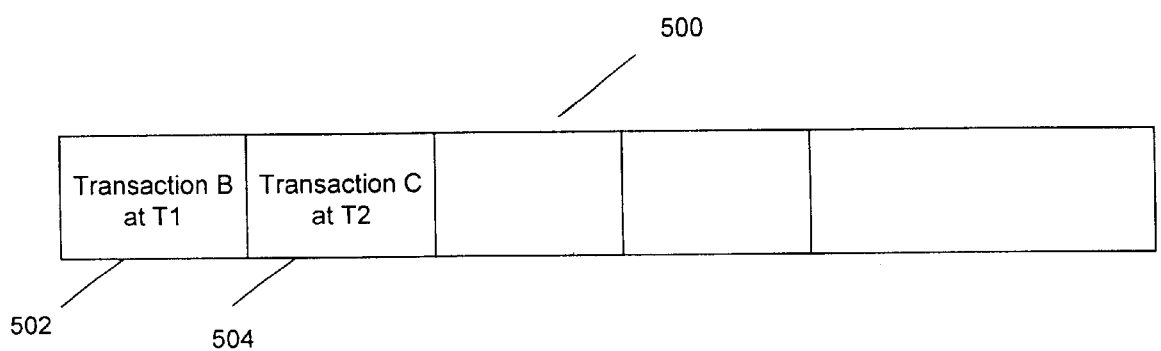
FIG. 5 is a block diagram illustrating an exemplary chain of active transactions that have read interests in a deleted LOB.

FIG. 5 is a block diagram illustrating an exemplary chain 500 of information about active transactions that have read interests in a deleted LOB 402. The chain 500 includes information about the time at which a transaction acquired a read claim. The chain 500 contains element one 502 and element two 504. Element one 502 contains the time (T1) at which transaction B 408 acquired a read claim. Element two 504 contains the time (T2) at which transaction C 410 acquired a read claim.

Whenever a transaction acquires a read claim, the RCI system 124 retrieves the current end of log LSN value, which, in one embodiment of the invention, may be referred to as a "read identifier". The RCI system 124 stores this LSN in an agent control block that contains the claim/declaim information about a data space. The RCI system 124 chains the agent control block off of a global pageset claim/declaim control block. This chain contains all read claims. New chain elements are appended to the end of the chain (i.e., the oldest read claims are the first elements on the chain).

The chaining is done under an exclusive latch to serialize operations on the chain. When a transaction declaims, the corresponding agent control block is removed from the chain of the global pageset claim/declaim control block. If it is determined that the removed agent control block had the oldest read claim on the object, then the read-LSN for that object is updated to that of the next oldest read claim (or, if no read claims are present, to a sufficiently high value). By checking the read-LSN value stored in the global pageset claim/declaim control block, the RCI system 124 can instantly determine the age of the oldest read claims within an object, relative to when updates were made (because all updates are logged).

In one embodiment of the invention, the RCI system 124 is used during space allocation within LOB table spaces. When LOB values are deleted, the space used by these LOB values is marked as deallocated, but the space may not be reallocated until the deletion is committed and no reader has an interest in the deleted value. For example, it is possible that a reader may have acquired a locator on the LOB value before the LOB value was deleted. In this case, the reader may go back and read the LOB value, even after the deletion. The RCI system 124 ensures this read works by protecting the deleted LOB value until all readers that could have an interest in the LOB complete (e.g., commit and/or release locators on the LOB value).

Rather than using locking, the RCI system 124 checks the read-LSN value ("read identifier") when looking at a space map page. Additionally, the RCI system 124 stores a "write identifier" that indicates the time at which a portion of the database was last changed. Thus, before allocating any portion of the database to another transaction, the RCI system 124 uses the read identifier of the oldest active transaction and the write identifier of the portion of the database to be allocated to determine whether any transactions are reading that portion of the database.

In particular, if the oldest read claim on the pageset (as indicated by the read identifier (e.g., the read-LSN value) occurred after the time that the last update was made to the space map page (as indicated by the write identifier), then the RCI system 124 determines that no active transaction in the system could have a read interest in any LOB that has been deallocated from this space map page (i.e., because the deleting transaction must have updated the space map page header with the LSN value of the log record that it wrote for the deallocation and no reader that was present at that time is still in the system, as indicated by the read-LSN value). Thus, the RCI system 124 determines that the deallocated pages may be reallocated.

Figure 6:
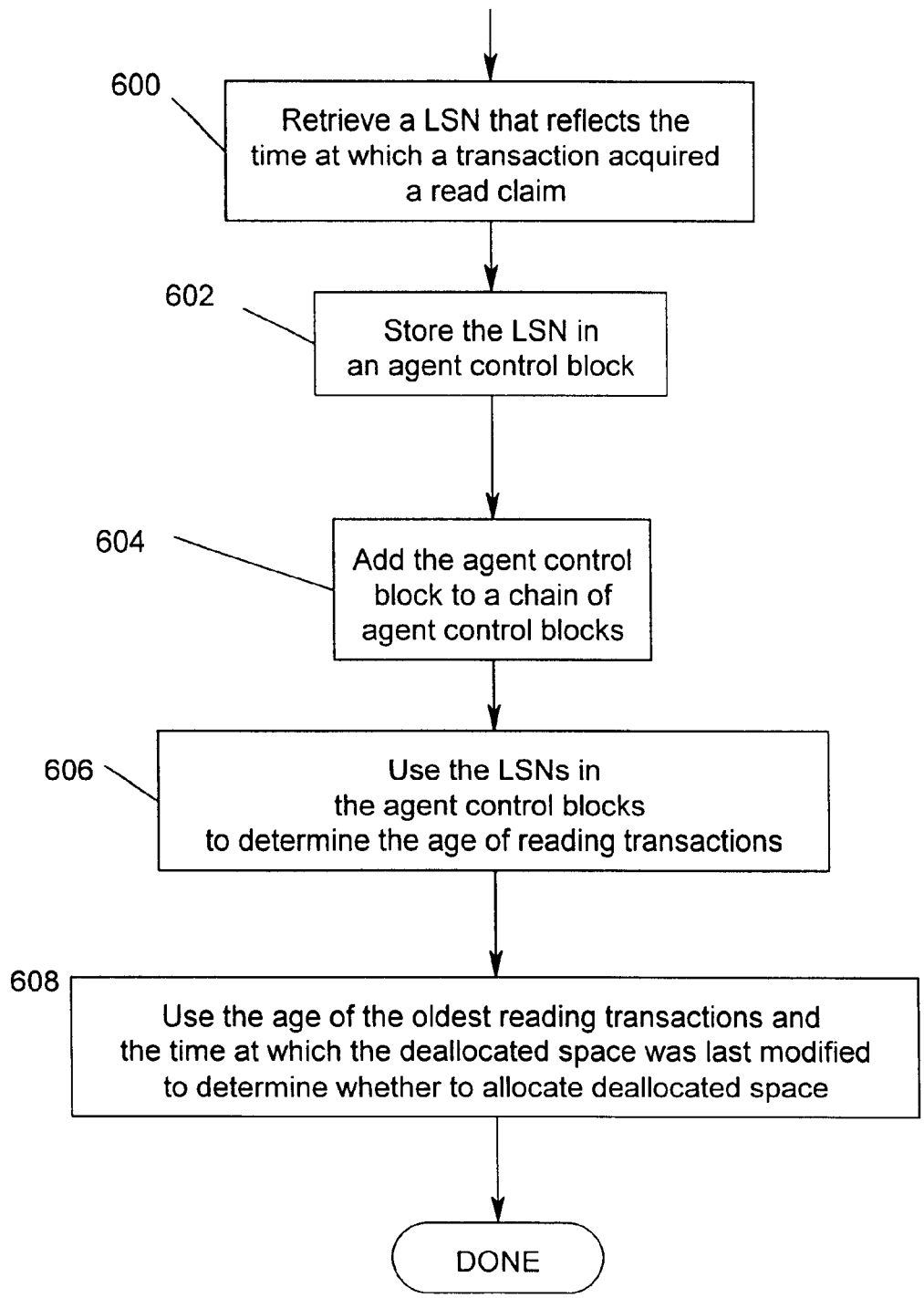
FIG. 6 is a flowchart illustrating the steps performed by the read in accordance with the present invention.

FIG. 6 is a flowchart illustrating the steps performed by the RCI system 124 in accordance with the present invention. Block 600 represents the RCI system 124 retrieving a read-LSN ("read identifier"). The read-LSN reflects the time at which a transaction acquired a read claim on a database object in a database. The read-LSN is then stored in the agent control block, as represented by block 602. Block 604 represents the RCI system 124 chaining the agent control block with the agent's claim information with other agent control blocks. Block 606 represents the RCI system 124 using the readLSN numbers in the agent control blocks to determine the age of the oldest reading transactions. In one embodiment of the invention, the RCI system 124 uses this information along with the time at which the deallocated space was last modified (as indicated by a "write identifier") to determine whether to allocate deallocated space, as represented by Block 608.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. Additionally, the read-LSN value has many applications.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for processing objects in a database that is stored on at least one data storage device connected to a computer, the method comprising:
   storing a read identifier for each reading transaction, wherein the read identifier reflects a time at which the reading transaction first accesses an object stored in the database; and
   using the read identifiers to determine an age of an oldest active transaction.

2. The method of claim 1, wherein the method further comprises:
   associating a write identifier with a portion of the database, wherein the write identifier reflects a time at which that portion of the database was last modified; and
   before allocating any portion of the database to another transaction, using the read identifier of the oldest active transaction and the write identifier of the portion of the database to determine whether any transactions are reading that portion of the database.

3. The method of claim 2, wherein the method further comprises, when it is determined that no transaction is reading the portion of the database, allocating the portion of the database to another transaction.

4. The method of claim 2, wherein the portion of the database is a page.

5. The method of claim 2, wherein the read identifier is a timestamp.

6. The method of claim 2, wherein the read identifier is a log sequence number.

7. The method of claim 2, wherein the write identifier is a timestamp.

8. The method of claim 2, wherein the write identifier is a log sequence number.

9. The method of claim 2, wherein, before allocating any portion of the database, using the read identifier of the oldest active transaction and the write identifier of the portion of the database further comprises determining whether any transactions are reading that portion of the database in a shadow copy recovery scheme.

10. The method of claim 2, wherein storing a read identifier further comprises storing the read identifiers in a chain associated with a pageset.

11. The method of claim 1, wherein the reading transaction is a read claim.

12. An apparatus for processing objects in a database, comprising:
   a computer having at least one data storage device connected thereto, wherein the data storage device stores a database;
   one or more computer programs, performed by the computer, for storing a read identifier for each reading transaction, wherein the read identifier reflects a time at which the reading transaction first accesses an object stored in the database, and using the read identifiers to determine an age of an oldest active transaction.

13. The apparatus of claim 12, further comprising:
   means for associating a write identifier with a portion of the database, wherein the write identifier reflects a time at which that portion of the database was last modified; and
   means for, before allocating any portion of the database to another transaction, using the read identifier of the oldest active transaction and the write identifier of the portion of the database to determine whether any transactions are reading that portion of the database.

14. The apparatus of claim 13, further comprising one or more computer programs, performed by the computer, for, when it is determined that no transaction is reading the portion of the database, allocating the portion of the database to another transaction.

15. The apparatus of claim 13, wherein the portion of the database is a page.

16. The apparatus of claim 13, wherein the read identifier is a timestamp.

17. The apparatus of claim 13, wherein the read identifier is a log sequence number.

18. The apparatus of claim 13, wherein the write identifier is a timestamp.

19. The apparatus of claim 13, wherein the write identifier is a log sequence number.

20. The apparatus of claim 13, wherein the means for using further comprises means for, before allocating any portion of the database, using the read identifier of the oldest active transaction and the write identifier of the portion of the database to determine whether any transactions are reading that portion of the database in a shadow copy recovery scheme.

21. The apparatus of claim 13, wherein the means for storing further comprises means for storing the read identifiers in a chain associated with a pageset.

22. The apparatus of claim 12, wherein the reading transaction is a read claim.

23. The apparatus of claim 12, further comprising:
   one or more computer programs that associate a write identifier with a portion of the database, wherein the write identifier reflects a time at which that portion of the database was last modified; and
   one or more computer programs that, before allocating any portion of the database to another transaction, use the read identifier of the oldest active transaction and the write identifier of the portion of the database to determine whether any transactions are reading that portion of the database.

24. The apparatus of claim 23, wherein, before allocating any portion of the database, one or more computer programs that use the read identifier of the oldest active transaction and the write identifier of the portion of the database determine whether any transactions are reading that portion of the database in a shadow copy recovery scheme.

25. The apparatus of claim 23, wherein the one or more computer programs that store a read identifier further comprises one or more computer programs that store the read identifiers in a chain associated with a pageset.

26. An article of manufacture comprising a computer program carrier readable by a computer and embodying one or more instructions executable by the computer to perform a method that processes objects in a database that is stored on at least one data storage device connected to a computer, the method comprising:
   storing a read identifier for each reading transaction, wherein the read identifier reflects a time at which the reading transaction first accesses an object stored in the database; and using the read identifiers to determine an age of an oldest active transaction.

27. The article of manufacture of claim 26, wherein the method further comprises:

associating a write identifier with a portion of the database, wherein the write identifier reflects a time at which that portion of the database was last modified; and before allocating any portion of the database to another transaction, using the read identifier of the oldest active transaction and the write identifier of the portion of the database to determine whether any transactions are reading that portion of the database.

28. The article of manufacture of claim 27, wherein the method further comprises, when it is determined that no transaction is reading the portion of the database, allocating the portion of the database to another transaction.

29. The article of manufacture of claim 27, wherein the portion of the database is a page.

30. The article of manufacture of claim 27, wherein the read identifier is a timestamp.

31. The article of manufacture of claim 27, wherein the read identifier is a log sequence number.

32. The article of manufacture of claim 27, wherein the write identifier is a timestamp.

33. The article of manufacture of claim 27, wherein the write identifier is a log sequence number.

34. The article of manufacture of claim 27, wherein, before allocating any portion of the database, using the read identifier of the oldest active transaction and the write identifier of the portion of the database further comprises determining whether any transactions are reading that portion of the database in a shadow copy recovery scheme.

35. The artical of manufacture of claim 27, wherein storing a read identifier further comprises storing the read identifiers in a chain associated with a pageset.

36. The article of manufacture of claim 26, wherein the reading transaction is a read claim.

* * * * *